United States Patent [19]

DiValentin et al.

[11] Patent Number: 4,703,189

[45] Date of Patent: Oct. 27, 1987

[54] TORQUE CONTROL FOR A VARIABLE SPEED WIND TURBINE

[75] Inventors: Eugene D. DiValentin, Enfield; Henry S. Healy, Bloomfield, both of Conn.

[73] Assignee: United Technologies Corporation, Hartford, Conn.

[21] Appl. No.: 799,046

[22] Filed: Nov. 18, 1985

[51] Int. Cl.⁴ ............................................. F03D 9/00
[52] U.S. Cl. ...................................... 290/44; 290/55; 322/35
[58] Field of Search .................... 290/42, 43, 44, 52, 290/53, 54, 55; 416/132 A, 132 B; 415/1–8; 322/35, 41, 29

[56] References Cited

U.S. PATENT DOCUMENTS

| | | | |
|---|---|---|---|
| 4,160,170 | 7/1979 | Harner et al. | 290/55 X |
| 4,161,658 | 7/1979 | Patrick | 290/55 X |
| 4,189,648 | 2/1980 | Harner | 290/55 X |
| 4,330,743 | 5/1982 | Glennon | 322/10 |
| 4,331,881 | 5/1982 | Soderholm et al. | 290/44 |
| 4,339,666 | 7/1982 | Patrick et al. | 290/44 |
| 4,400,659 | 8/1983 | Barron et al. | 322/28 X |
| 4,420,692 | 12/1983 | Kos et al. | 290/44 |
| 4,435,647 | 3/1984 | Harner et al. | 290/44 |
| 4,481,459 | 11/1984 | Mehl et al. | 322/29 X |
| 4,503,673 | 3/1985 | Schachle et al. | 290/44 X |
| 4,511,807 | 4/1985 | Somerville | 290/42 X |
| 4,525,633 | 6/1985 | Wertheim et al. | 290/44 |
| 4,565,929 | 1/1986 | Baskin et al. | 290/44 |

FOREIGN PATENT DOCUMENTS 107796 8/1981 Japan.
150999 11/1981 Japan.

OTHER PUBLICATIONS

Microprocessor Control of a Wind Turbine Generator IECI, Mar. 20–22, 1978.
Speed Control of a Large Wind Energy Converter, 2466 Siemens, Power Engineering & Automation, No. 1, Germany, Jan.–Feb. (7/85).
Controls for Variable Pitch Wind Turbine Generators, 8047 IEEE, vol. PAS-103 (1984), Apr., No. 4.
"Variable Rotor Speed for Wind Turbines" by EPRI Electric Power Research Institute (9/1985), AP-4261.

Primary Examiner—William M. Shoop, Jr.
Assistant Examiner—Shik Luen Paul Ip
Attorney, Agent, or Firm—Francis J. Maguire, Jr.

[57] ABSTRACT

Apparatus and method for controlling a variable speed wind turbine-generator at improved efficiencies is disclosed. The method and apparatus of the invention control the rotor tip speed below the limiting torque of the wind turbine at a selected constant velocity ratio with respect to wind speed and, above the limiting torque, control the rotor tip speed at speeds greater than those dictated by the constant velocity ratio up to a speed or power limit. This may be accomplished by controlling tip speed above the point where limiting torque is attainable to maintain optimal wind turbine performance along the performance envelope.

6 Claims, 6 Drawing Figures

TORQUE CONTROL FOR A VARIABLE SPEED WIND TURBINE

DESCRIPTION

1. Reference To A Related Application

The invention described herein may employ some of the teachings disclosed and claimed in commonly owned co-pending application having U.S. Ser. No. 799,045, filed on the same day as this application, invented by Doman et al, entitled A VARIABLE SPEED WIND TURBINE, which is hereby expressly incorporated by reference.

2. Technical Field

This invention relates to wind turbines, and particularly to a torque control for a variable speed wind turbine which operates the wind turbine at improved efficiencies.

3. Background Art

Various types of wind machines including constant rotor speed and adjustable speed machines are known. Since the turbine-generator is normally directly connected to a fixed frequency electrical power grid constant speed wind turbines have predominated. Variable speed wind turbines cannot be directly connected to the grid because of their variable frequency electrical power output. This necessitates the interposition of a frequency converter between the generator and the grid to make the frequency conversion. Various techniques are well known for such frequency converters including cycloconverters and rectifier-inverters.

In addition, electronic speed control techniques have been developed for all types of motors using the thyristor, or silicon-controlled rectifier (SCR). It has become apparent to wind energy theorists that it is possible to use an adjustable speed AC drive in reverse. In other words, instead of using the adjustable speed drive as a receiver of fixed frequency AC for conversion to variable frequency AC for driving a motor, it is possible to provide the frequency converter with variable frequency AC from an AC generator for conversion to fixed frequency AC for supplying a power grid.

As known in the wind energy art, the kinetic energy available from an oncoming wind stream varies as the size of swept area, density, and cube of the wind velocity. It has been shown that no more than 59% of the energy can be extracted and the ability of any wind turbine to approach that maximum has been named the coefficient of performance, $C_p$. Coefficient of performance is related to the aerodynamic features of a given machine, particularly the tip speed ratio, which is defined as the ratio of tangential speed of the blade tip over the speed of the oncoming wind. If this ratio can be maintained at the machine's peak coefficient of performance by letting rotor speed follow wind speed, the wind turbine becomes highly efficient. In addition, variable speed wind turbines provide the opportunity for short term energy storage. I.e., wind speed transients can be integrated into speed changes. The control strategy for such a wind turbine should be based on electrical adjustment of generator torque.

The prior art design philosophy for a variable speed wind turbine generator uses the following approach:

(1) Constant Velocity Ratio (CVR) Variable Speed Operation Below A Limiting Torque During this phase of operation, rotor speed is linearly proportional to the wind speed. Torque increases as the square of the wind speed and power increases as the cube of the wind speed. The pitch angle (for a variable pitch propeller) or yaw angle (for a fixed pitch propeller) is held constant.

2 CVR Variable Speed Operation Above a Limiting Torque

Above the wind speed at which a torque limit is reached the torque is held constant, the velocity ratio is held constant, and the rotor speed varies linearly with wind speed. The power also increases linearly with the wind speed. The blade pitch angle, or yaw heading, is modulated to hold torque constant.

(3) Constant Power Operation

When a rotor speed and/or power limit is reached, power is held constant by holding rotor speed and torque constant using active pitch or yaw control.

DISCLOSURE OF THE INVENTION

The object of the present invention is to increase the efficiency of a variable speed wind turbine generator.

According to the present invention, above the wind speed at which a preset torque limit is reached, the torque is still held constant; however, the rotor speed is allowed to increase at a faster rate than if constant velocity ratio operation had been continued as in the prior art. This may be done by controlling to a constant torque level and allowing rotor speed to increase in a manner which maintains optimal performance. Thus, the power is allowed to increase above the limiting torque at a rate greater than the rate that would be obtained if constant velocity ratio operation were used, as in the prior art. The power increases until a speed or power limit is reached, as in the prior art. However, this level is reached at a lower wind speed than in the prior art. Thought of in terms of rotor performance, according to the present invention, the velocity ratio increases as the rotor speed increases above the limiting torque. While controlling to a constant torque, the optimum power ratio and therefore power will be achieved by following the rotor performance envelope for all velocity ratios until a power and/or rotational speed limit is reached. Thus, while the velocity ratio increases, the power ratio will decrease slightly from the maximum point at which it was operating during constant velocity ratio operation.

The present invention teaches a new design philosophy for a variable speed wind turbine generator in which additional power may be recovered above the wind speed where the turbine-generator torque limit is reached by increasing rotor speed at a faster rate than dictated by constant velocity ratio operation. Maximum possible power is extracted while maintaining the preset torque limit. The annual increase in energy output from a wind turbine-generator using the design philosophy disclosed herein is on the order of approximately 5% over the prior art.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
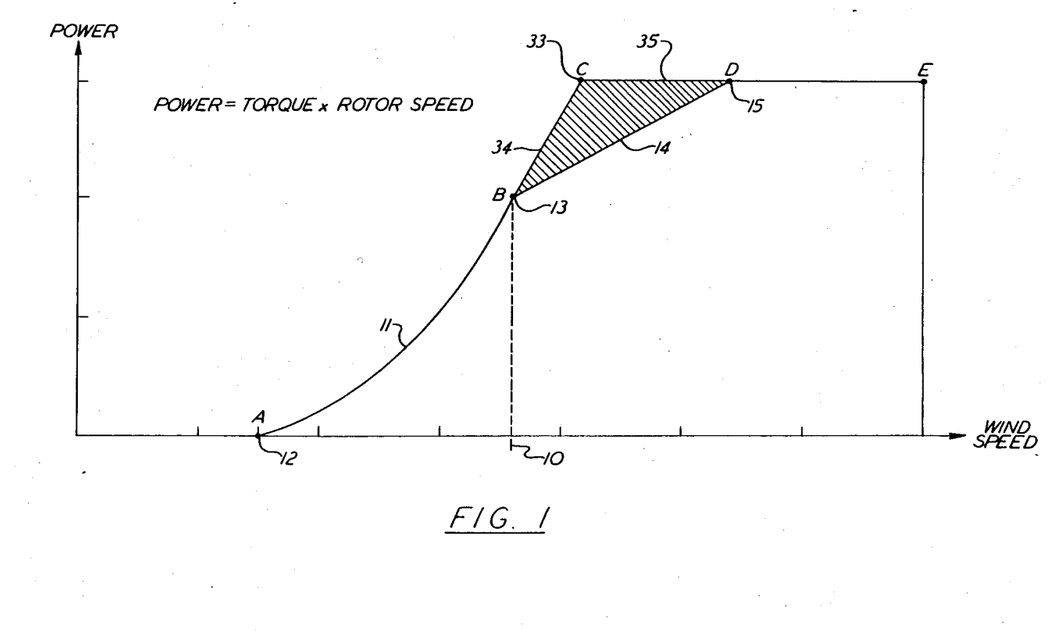
FIG. 1 is an illustration of a power v. wind speed curve which illustrates various variable speed wind turbine operating options, including operation dictated according to the present invention.

FIG. 1 is a plot of the power output from a variable speed wind turbine-generator against wind speed. Below a selected speed 10, corresponding to the limiting torque of the particular wind turbine gearbox, the turbine is operated with a constant velocity ratio (blade tip speed over wind speed) as indicated by the locus of points 11 between points A 12 and B 13. From A to B the torque is proportional to the square of the wind speed and the output power is proportional to the cube of the wind speed. Thus, the locus of points 11 from A to B is a cubic function corresponding to the power output of the generator.

As discussed in the Background Art section, the prior art design philosophy for a variable speed wind turbine generator limits the torque to a constant value above wind speeds at which the limiting torque is achieved (as is necessarily also the case in the present invention) and the velocity ratio is held constant at speeds above the limiting torque whereby the rotor speed varies linearly with wind speed. Thus, in the prior art, the power also increases linearly with wind speed as shown by the locus of points 14 from point B 13 to point D 15 in FIG. 1. Whereas the blade pitch angle and yaw heading is held constant from points A to B, the prior art method of holding torque constant while still increasing power above the torque limit is to make moderate blade pitch angle or yaw heading changes from points B to D. At point D, where a rotor speed and/or power limit is reached, power is held constant by holding rotor speed and torque constant using more significant pitch or yaw heading changes, i.e., using more active pitch or yaw control. At point E, the cut-out wind speed is reached and the pitch or yaw angle is changed to bring the rotor to a stop.

Figure 2:
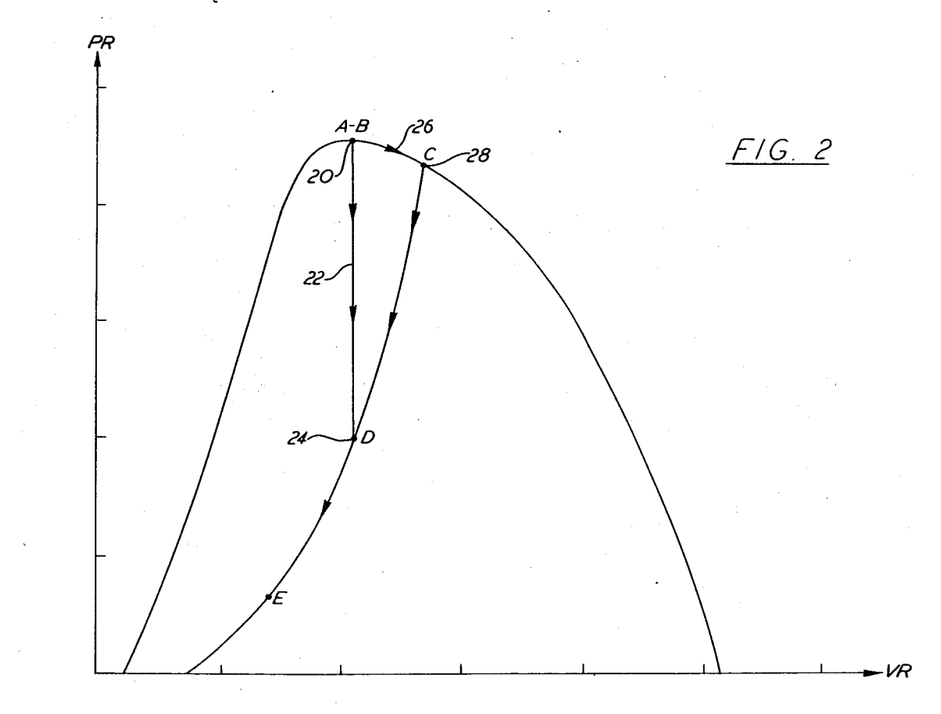
FIG. 2 is an illustration of a particular wind turbine rotor performance map showing the variable speed operating options illustrated in FIG. 1 in a non-dimensional format.

Referring now to FIG. 2, an illustration is provided of a performance map for a wind turbine rotor showing the contrast between variable speed operation according to the prior art and according to the present invention. FIG. 2 shows a plot of maximum power ratio versus velocity ratio for a particular rotor. Depending on the particular rotor blade chord distribution, twist distribution, thickness distribution, etc., the performance curve will vary among rotor types significantly. The power ratio (PR) is defined as the actual power output of the wind turbine divided by the power provided by the wind. In other words, the power ratio represents the efficiency of the wind turbine rotor in extracting the available power provided to it by the wind. The velocity ratio (VR) is the tip speed of the rotor divided by the wind speed. The rotor performance map holds true for certain blade shapes and will of course change depending on particular types of rotors, as mentioned above. A point 20 is shown in FIG. 2 which is illustrative of a point of maximum constant power ratio and constant velocity ratio corresponding to operation on the curve 11 of FIG. 1 from points A 12 to B 13. Thus, by operating along the locus of points 11 of FIG. 1, one obtains maximum efficiency by correspondingly staying at point 20 in FIG. 2. The restraining torque, which counteracts the rotor torque, is controlled through the generator to maintain a fixed ratio between rotor rotational speed and incoming wind speed. This torque control maintains a fixed velocity ratio at the rotor performance peak. This is shown schematically in FIG. 2 at point A-B 20. The prior art method of running speed up above the torque limit, from points B 13 to D 15 along the locus of points 14 in FIG. 1, is illustrated in FIG. 2 as a path 22 of decreasing power ratio at constant velocity ratio from point A=B 20 to a point d 24 corresponding to point D 15 of FIG. 1. As will be seen from the teachings of the present invention, it is a better idea to extract more power by operating above the torque limit along a path 26 on the optimum performance curve from point A-B 20 to a point C 28. In this way, the power ratio is decreased only a small amount according to the present invention, instead of the corresponding large amount of change in power ratio, according to the prior art.

Thus, referring back to FIG. 1, operation from point B 13 at the torque limit to a point C 33 along a locus of points 34, instead of along the locus of points 14, is taught by the present invention. This operation is accomplished by commanding a constant torque restraint at the generator and allowing the rotor speed to increase in relation to the incoming wind speed at a faster rate than below the limiting torque. This mode allows the velocity ratio to increase while keeping the rotor at higher power ratios and maintaining a constant torque. Upon reaching a power or speed limit at point C, rotor speed is not increased any further and the power remains constant from point C to point D along a path 35 and on to point E, as in the prior art. Thus, the shaded area BCD of FIG. 1 is proportional to the additional energy captured by a wind turbine-generator operated according to the present invention.

Figure 3:
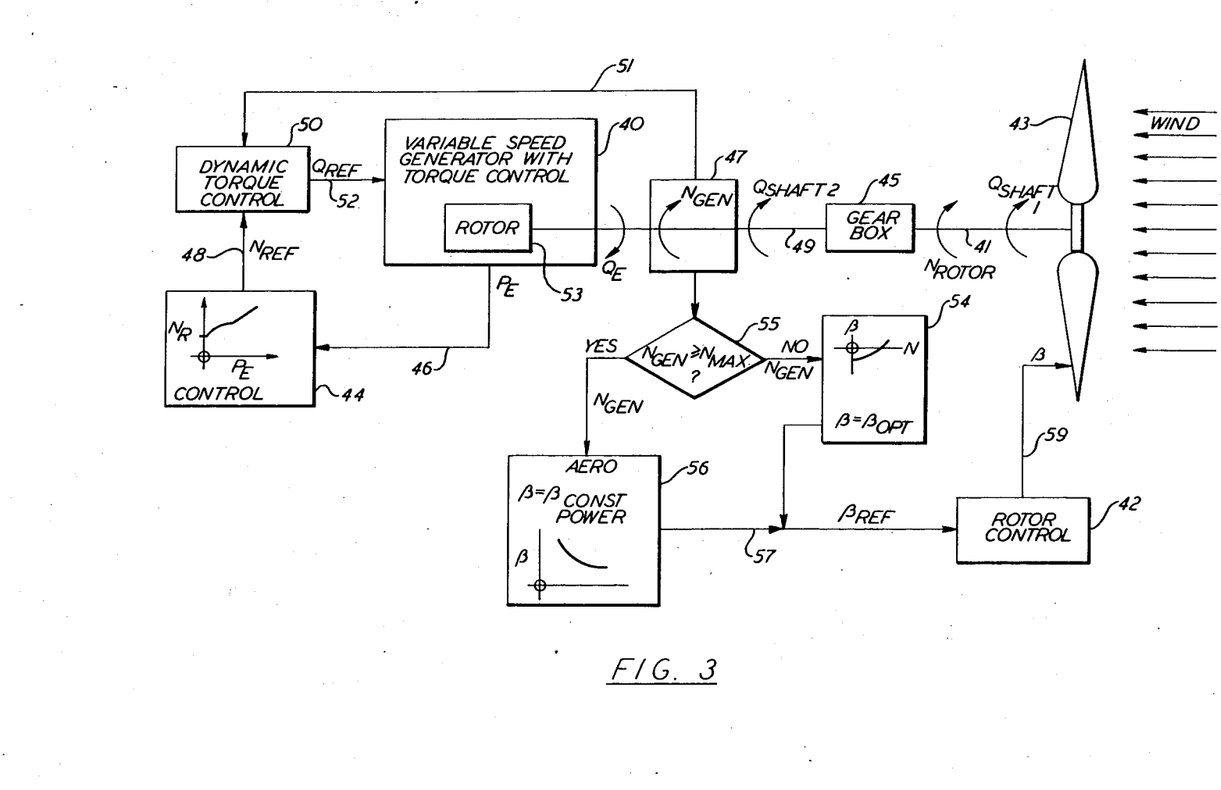
FIG. 3 is a simplified schematic block diagram illustration of a wind turbine-generator control for a variable speed generator.

FIG. 3 is an illustration of a wind turbine-generator control system for a variable speed generator, in which the present invention may be implemented as described below.

Below the torque limit of the wind turbine-generator, the control of FIG. 3 operates solely in a mode which controls generator torque by means of a generator torque control 40. In a system with pitch control, above the torque limit, a rotor control 42 also moves the pitch sufficiently to maintain the best $C_p$, but does not assume responsibility for speed control until a speed or power limit is reached. Whereas in the prior art, pitch change was utilized above the torque limit so as to keep the tip speed of the rotor constant with respect to the wind speed, thereby increasing power linearly with wind speed, the aerodynamic rotor control 42, according to the present invention, is operated at a constant angle or varied to maintain maximum rotor efficiency below the power or speed limit. The rotor speed will thus increase according to the performance envelope of FIG. 2 to maintain the power ratio versus velocity ratio relation of the rotor.

An aerodynamic torque ($Q_{SHAFT1}$) on the rotor shaft 41, created by the wind impinging on the rotor 43, is reacted through an opposing torque ($Q_E$) supplied by a variable speed torque-controlled generator 40. The rotor rotational speed ($N_{ROTOR}$) on shaft 41 will follow the rotor characteristics shown in FIG. 2 to balance the input power supplied by the wind to the rotor 43. A gearbox 45 is shown to increase the rotor speed on shaft 41 to the generator speed ($N_{GEN}$) sensed by the sensor 47 on shaft 49. This speed increase produces a torque ($Q_{SHAFT2}$), which is a fraction of the rotor torque by the gearbox ratio, on shaft 49 that is to be reacted by the generator 40.

Below a limiting torque a schedule 44 is responsive to a sensed output power signal on a line 46 indicative of the level of electrical power being delivered by the generator. The schedule provides a generator speed reference signal on line 48 to a dynamic torque control unit 50 which is responsive to the difference between the speed reference signal on line 48 and the generator speed signal on line 51. The speed error is dynamically adjusted through the control 50 by commanding changes in generator torque on line 52. The generator 40 responds to the commanded torque and brings the generator speed and power to convergence according to schedule 44 which includes the constant torque region described in FIG. 2 by the locus of points 26. The torque produced by the generator through the rotor 53 reacts with the turbine shaft 41 torque to maintain a fixed rotor speed in relation to wind speed.

A generator speed comparator 55 shifts control of the pitch or yaw angle ($\beta$) depending on the status of present generator speed. At generator speeds below the maximum allowed generator speed, a schedule 54 is followed. In the region below the limiting torque, $\beta$ is held constant with the torque control 50 maintaining rotor speed according to schedule 44.

At wind speeds above the limiting torque and rotor speeds below maximum allowable speed, $\beta$ is varied to maintain optimum power as a function of the rotor speed while maintaining a constant torque according to schedule 54. For a pitch-controlled turbine the output of the schedule control 54 ($\beta_{REF}$) on line 57, is transmitted to the rotor control which commands pitch angle actuators to actuate linkages shown by a line 59 to move the rotor to the desired position. For a yaw control turbine the output of schedule 54 remains constant for optimum power.

When the generator speed reaches the maximum limit on the system, either due to structural or performance considerations, the speed comparator switches control to an angle controller 56 which maintains constant speed. The controller 56 compares the actual generator speed to maximum speed and commands a pitch or yaw angle which will maintain constant rotor speed. A $\beta_{REF}$ signal is transmitted from controller 56 along line 57 to the rotor control 42 which commands the pitch or yaw actuators to move the rotor to the desired position. Power remains constant at this constant rotor signal since torque is also maintained at the limiting torque value.

Thus, it will be understood by those skilled in the art that the illustration of FIG. 3, including circuitry and variable speed generator electrical components can be made to carry out the teachings of the present invention. Although FIG. 3 has been shown using various functional blocks and schedules, as an aid to understanding the teachings of the present invention, it will be understood that the control functions illustrated will normally be carried out by a digital embodiment including a signal processor which includes a CPU, I/O, and ROM, RAM, etc.

Figure 6:
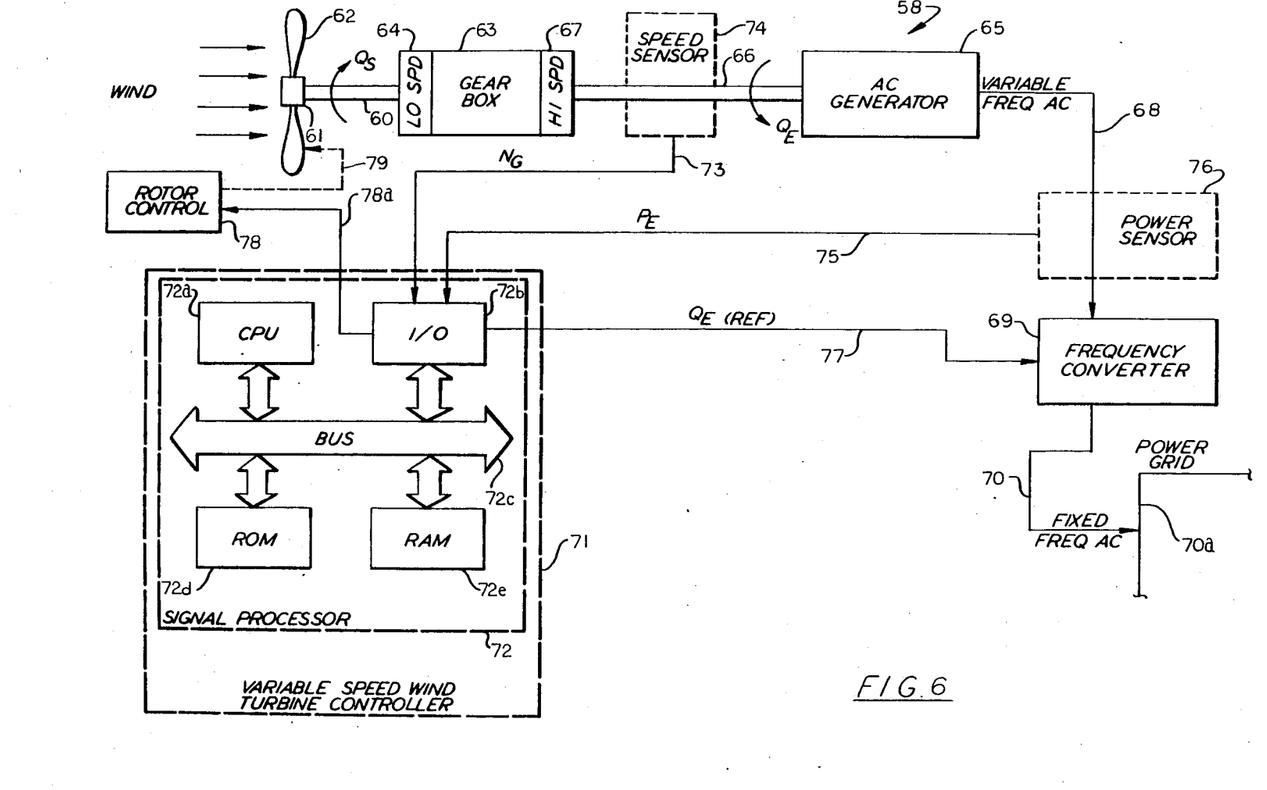
FIG. 6 is a simplified schematic block diagram illustration of a variable speed wind turbine in which the teachings of the present invention may be incorporated.

For example, FIG. 6 illustrates, in simplified schematic block diagram form, a variable speed wind turbine in which the teachings of the present invention may be incorporated. There, a wind turbine 58 has a turbine rotor shaft 60 with a hub 61 at one end thereof having at least one blade 62 attached to the hub. Gearbox 63 has a low speed side 64 attached to the other end of the turbine rotor shaft. An AC generator 65 has a generator rotor shaft 66 attached to a high speed side 67 of the gearbox. The turbine rotor torque ($Q_s$) drives the generator rotor. The generator provides an air gap torque ($Q_E$) which opposes the input turbine rotor torque. The AC generator provides variable frequency AC on a line 68 to a frequency converter 69 which converts the variable frequency AC to a fixed frequency AC on a line 70 which is in turn provided to a power grid 70a.

A variable speed wind turbine controller 71 includes a signal processor 72 in which there is a CPU 72a, and an I/O unit 72b which interfaces with a bus 72c. The signal processor may also include a ROM unit 72d and a RAM unit 72e as well as other hardware (not shown). The signal processor's I/O unit is responsive to a sensed generator speed signal ($N_G$) on a line 73 provided by a speed sensor 74 which is responsive to the generator shaft speed. The I/O unit 72b is also responsive to a sensed power signal ($P_E$) on a line 75 from a power sensor 76 responsive to the magnitude of power provided on the line 68 to the frequency converter. The variable speed wind turbine controller 71, by means of the signal processor, determines what the generator air gap torque should be according to a function defining sensed power versus generator speed to obtain maximum efficiency. After determining what this level should be the signal processor provides through its I/O unit 72b, a generator torque command signal on a line 77 to the frequency converter.

The frequency converter may, for example, be a cycloconverter or a rectifier-inverter pair linked by a DC link. Both of these types of frequency converters, and others, are well known in the art and need not be discussed in detail here. Suffice it to say that the electronic-type converters use phase-controlled SCRs to control the power flow through the frequency converter. This is done by controlling the phase angle and firing of the SCR gates with respect to the phase of the utility grid in order to control the flow of real and reactive power. Thus, there will generally be a trigger circuit (not shown) within the frequency converter which is responsive to the torque command signal and which provides triggering pulses for the SCRs within the frequency converter. A detailed description of the frequency converter and the triggering circuitry is unnecessary here, and will not be presented as these details are well known in the art.

A rotor control 78 provides aerodynamic torque control. This may take the form of pitch or yaw control. An aerodynamic torque command signal is provided on a line 78a by the signal processor to the rotor control 78. The rotor control provides a mechanical output signal on a line 79 which provides the aerodynamic torque control.

While a method and apparatus of managing rotor speed to maximize energy capture within a physical limit on drive system torque has been described above, there are, however, hardware costs that derive from the increased thrust that comes with the disclosed method of managing the speed which must be taken into account.

When the cost aspects of thrust increase are considered it is found that the economically optimum path for speed versus power management lies between that of the prior art described above in the Background Art section and the method for maximizing energy capture described above. Therefore, in practice, control of rotor speed above the point where limit torque is first developed can be done in a manner that holds rotor thrust constant despite increasing wind speed.

Figure 4:
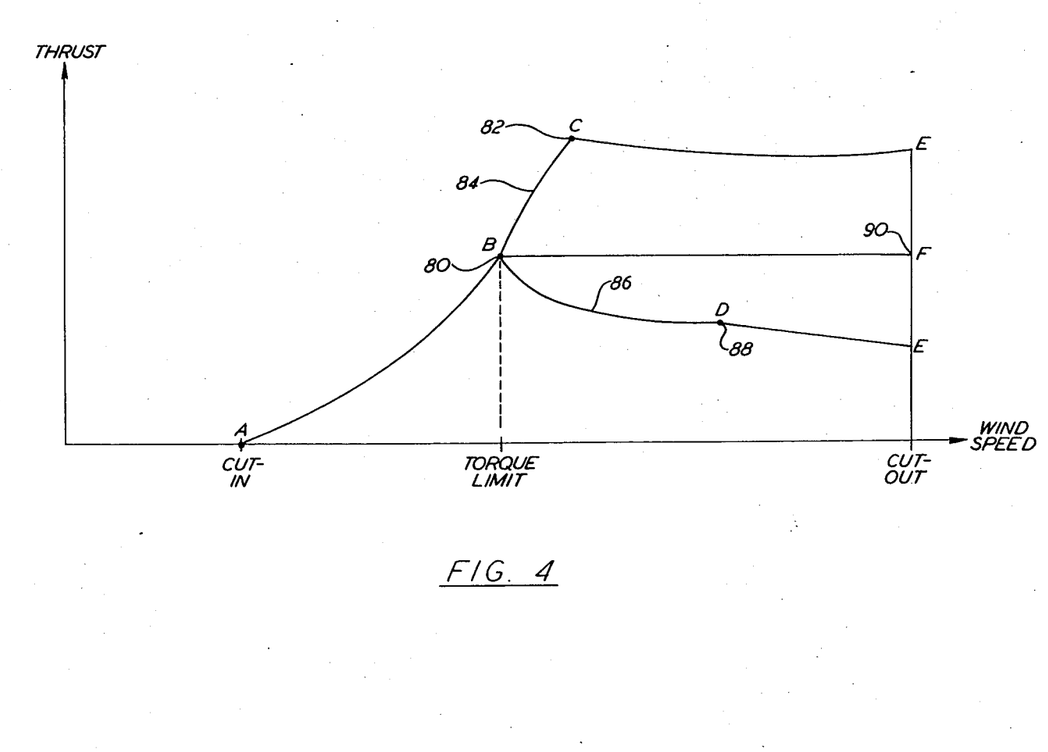
FIG. 4 is an illustration of a plot of thrust versus wind speed.

As may be seen from FIG. 4, rotor thrust forces increase rapidly from point B 80 to C 82. Path 84 corresponds to the locus of points 34 of FIG. 1. This increased thrust has some adverse effects on the economic improvements expected from this mode of operation. The path from B to C, described above, increases thrust very rapidly. The prior art (described as CVR operation above), on the other hand, shows a slump in thrust forces once a limit torque is reached (along a path 86 from point B 80 to point D, corresponding to the locus of points 14 of FIG. 1). A path B 80-F 90 can be selected in which the thrust is held constant while maintaining constant torque.

Figure 5:
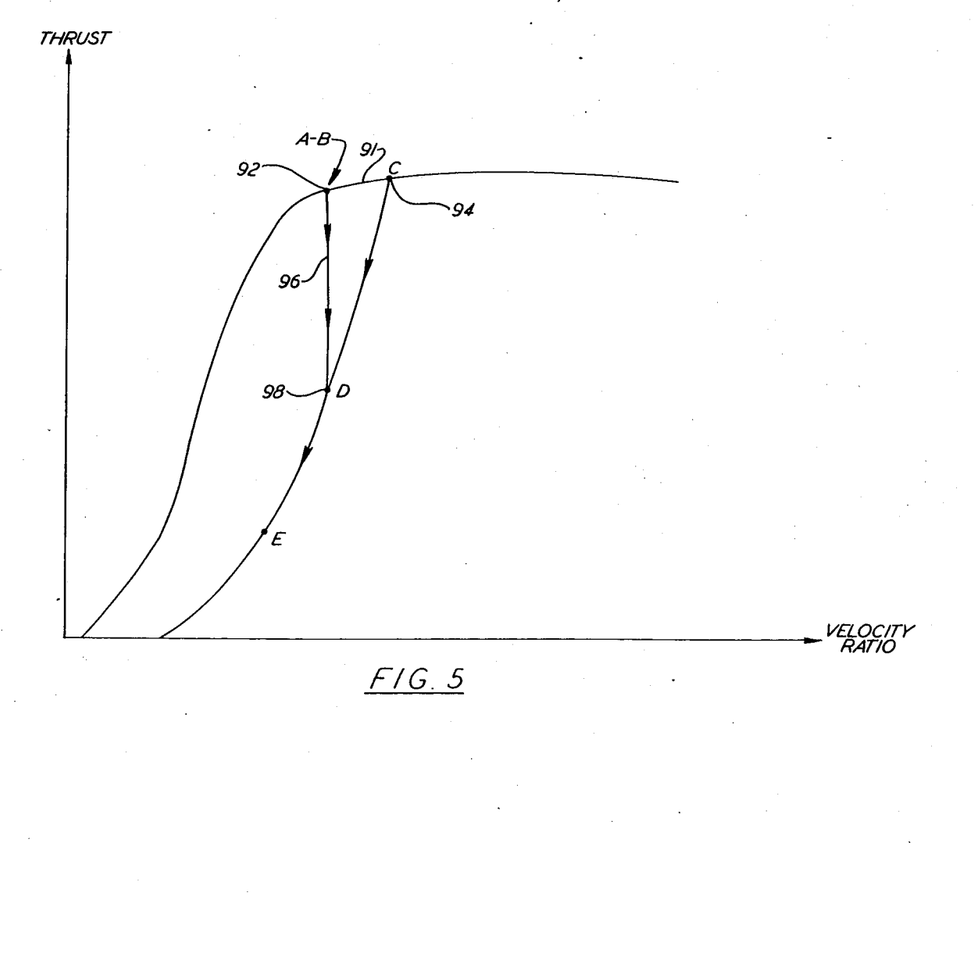
FIG. 5 is an illustration of a plot of thrust versus velocity ratio.

FIG. 5 illustrates the thrust ratio characteristics for a given rotor and the variable speed operation path. As shown, the thrust ratio and thus thrust increases along the path 91 from point A-B 92 to point C 94 which is the optimal power path. Along path 96 from point A-B 92 to point D 098 the thrust ratio is declining faster than the wind speed squared and thus thrust decreases as wind speed increases. An alternate path selected within triangular region A-B-C-D can be determined in which the locus of points will maintain constant thrust and a constant torque while power is increased by allowing rotor speed to increase. To accomplish this, the pitch or yaw angle of the turbine rotor must be managed to maintain the locus of these points. Of course, the selected locus will vary considerably depending upon particular installations.

As a further alternative, rotor speed may be controlled above the point where limit torque is first developed, is such a manner that tower cost and drive system costs combined are optimally related to the value of increased energy capture that is attained.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

I claim:

1. A method for controlling the torque of a variable speed wind turbine-generator, comprising the steps of:
   controlling, in response to sensed speed and power signals, the generator torque while operating below a torque limit of the wind turbine by providing a generator control signal for maneuvering the rotor tip speed at a selected constant velocity ratio with respect to wind speed; and
   controlling, in response to sensed speed and power signals, the generator torque while operating above the torque limit of the wind turbine by providing a generator control signal for maneuvering the rotor tip speed at speeds greater than those dictated by the constant velocity ratio up to a speed or power limit.

2. The method of claim 1, wherein the step of controlling generator torque above the torque limit up to the speed or power limit increases power output at the maximum value possible while maintaining a constant torque value by following the turbine performance map.

3. Apparatus for controlling a variable speed wind turbine-generator at improved efficiencies, comprising:
   a speed sensor, responsive to either the wind turbine rotor or generator rotor speed for providing a sensed turbine-generator speed signal;
   a power sensor, responsive to the power output of the generator for providing a sensed power signal; and
   a controller, responsive to the sensed speed signal and to the sensed power signal for providing a wind turbine-generator torque control signal for controlling the generator torque for maneuvering the turbine rotor tip speed below the torque limit of the wind turbine at a selected constant velocity ratio with respect to wind speed and at speeds greater than those dictated by the constant velocity ratio above the torque limit up to a speed or power limit while holding torque constant.

4. The apparatus of claim 3, wherein the controller increases power output above the torque limit as a function of the product of the cube of wind speed and the power ratio.

5. The apparatus of claim 3, further comprising an aerodynamic torque control, responsive to an aerodynamic torque command signal for changing the aerodynamic torque of the turbine rotor and wherein the controller includes means responsive to the sensed speed signal for providing an aerodynamic torque command signal for commanding changes in aerodynamic control for increases in power output above the torque limit in a manner that aerodynamically holds rotor thrust constant despite increasing wind speed while maintaining a constant torque value.

6. The method of claim 1, further comprising the steps of:
   responding to said sensed speed signal and providing, in response thereto, an aerodynamic force command signal for commanding changes in aerodynamic control for increasing power output above the torque limit in a manner that aerodynamically holds rotor thrust constant with increasing wind speed while maintaining a constant torque value; and
   responding to said aerodynamic force command signal for changing the aerodynamic torque of the turbine rotor.

* * * * *